(12) United States Patent
Moyer

(10) Patent No.: US 7,865,704 B2
(45) Date of Patent: Jan. 4, 2011

(54) SELECTIVE INSTRUCTION BREAKPOINT GENERATION BASED ON A COUNT OF INSTRUCTION SOURCE EVENTS

(75) Inventor: William C. Moyer, Dripping Springs, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 364 days.

(21) Appl. No.: 11/392,383

(22) Filed: Mar. 29, 2006

(65) Prior Publication Data
US 2007/0234017 A1 Oct. 4, 2007

(51) Int. Cl.
G06F 11/00 (2006.01)
G06F 9/44 (2006.01)

(52) U.S. Cl. .................. 712/227; 714/34; 717/129
(58) Field of Classification Search ................ 712/227; 714/34; 717/124, 129
See application file for complete search history.

(56) References Cited

U.S. PATENT DOCUMENTS

| 4,635,193 | A |   | 1/1987 | Moyer et al. |
|---|---|---|---|---|
| 5,564,015 | A | * | 10/1996 | Bunnell ..................... 714/47 |
| 5,754,839 | A | * | 5/1998 | Pardo et al. ................. 712/227 |
| 5,838,897 | A | * | 11/1998 | Bluhm et al. ................. 714/30 |
| 5,875,294 | A | * | 2/1999 | Roth et al. ................... 714/39 |
| 5,889,981 | A | * | 3/1999 | Betker et al. ................ 712/227 |
| 5,931,956 | A | * | 8/1999 | Neff ........................... 714/34 |
| 6,052,774 | A | * | 4/2000 | Segars et al. ................. 712/200 |
| 6,591,378 | B1 |   | 7/2003 | Arends et al. |
| 6,654,934 | B1 | * | 11/2003 | Nemecek et al. ................ 716/4 |
| 6,751,751 | B1 | * | 6/2004 | Murray et al. ................. 714/34 |
| 6,769,076 | B1 |   | 7/2004 | Moyer et al. |
| 6,798,713 | B1 |   | 9/2004 | Yearsley et al. |
| 6,920,586 | B1 |   | 7/2005 | Moyer |
| 6,981,248 | B2 |   | 12/2005 | Bates et al. |
| 2002/0065646 | A1 | * | 5/2002 | Waldie et al. ................. 703/26 |
| 2002/0144235 | A1 | * | 10/2002 | Simmers et al. ............. 717/124 |
| 2003/0061599 | A1 | * | 3/2003 | Bates et al. ................. 717/129 |
| 2004/0148548 | A1 |   | 7/2004 | Moyer et al. |
| 2005/0257089 | A1 |   | 11/2005 | Williams et al. |
| 2007/0005322 | A1 | * | 1/2007 | Patzer et al. ................. 703/14 |

OTHER PUBLICATIONS

International Search Report and Written Opinion for correlating PCT Patent Application No. PCT/US07/62532 dated Jul. 7, 2008.

* cited by examiner

Primary Examiner—David J Huisman

(57) ABSTRACT

A method includes generating an instruction address value in response to an instruction source event. The method further includes selectively generating a breakpoint request based on the instruction source event and responsive to a comparison of the instruction address value to a breakpoint address value. In one embodiment, selectively generating a breakpoint request includes comparing the instruction source event to an instruction source event type, comparing the instruction address value to a breakpoint address value, and generating the breakpoint request responsive to a match between the first instruction source event type and the instruction source event and a match between the instruction address value and the breakpoint address value.

19 Claims, 3 Drawing Sheets

SELECTIVE INSTRUCTION BREAKPOINT GENERATION BASED ON A COUNT OF INSTRUCTION SOURCE EVENTS

FIELD OF THE DISCLOSURE

The present disclosure relates generally to processing devices, and more particularly to breakpoint control of a processing device during debug operations.

BACKGROUND

Breakpoints frequently are utilized in processing devices to debug errors in programs of instructions. Hardware-based breakpoints typically are implemented by comparing an instruction address of an instruction being fetched for execution at a processing device to one or more specified address values or address masks. In the event of a match, a breakpoint request is initiated, thereby causing the processing device to suspend execution and allowing the current state of the processing device to be analyzed for software debugging purposes. However, processing devices can generate the same instruction address in many different ways, and a user may not want to initiate a breakpoint for every instance of an instruction fetch to a given instruction address. These undesired breakpoints complicate debugging by unnecessarily halting program execution and by generating extraneous information that requires additional effort to filter and remove. Accordingly, an improved technique for generating breakpoints at a processing device would be advantageous.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DESCRIPTION OF THE DRAWINGS

In accordance with one aspect of the present disclosure, a method includes generating an instruction address value in response to an instruction source event. The method further includes selectively generating a breakpoint request based on the instruction source event and responsive to a comparison of the instruction address value to a breakpoint address value. In one embodiment, selectively generating a breakpoint request includes comparing the instruction source event to an instruction source event type, comparing the instruction address value to a breakpoint address value, and generating the breakpoint request responsive to a match between the first instruction source event type and the instruction source event and a match between the instruction address value and the breakpoint address value.

In accordance with another aspect of the present disclosure, a device includes a breakpoint control register to store a breakpoint address value and a first stored value representative of a first instruction source event type. The device further includes first comparator logic having a first input coupled to the breakpoint control register to receive the breakpoint address value, a second input to receive an instruction address value, and an output to provide an address match signal based on a comparison of the breakpoint address value to the instruction address value. The device additionally includes second comparator logic having a first input coupled to the breakpoint control register to receive the first stored value, a second input to receive an indication of an instruction source event that initiated the instruction access request, and an output to provide a source event match signal based on a comparison of the instruction source event to the first instruction source event type. The device also includes a breakpoint generation module having a first input coupled to the output of the first comparator logic to receive the address match signal, a second input coupled to the output of the second comparator logic to receive the source event match signal, and an output to provide a breakpoint request signal responsive to the address match signal and the source event match signal.

In accordance with yet another aspect of the present disclosure, a system includes means for generating an instruction address value in response to an instruction source event. The system further includes means for selectively generating a breakpoint request based on the instruction source event and responsive to a comparison of the instruction address value to a breakpoint address value.

Figure 1:
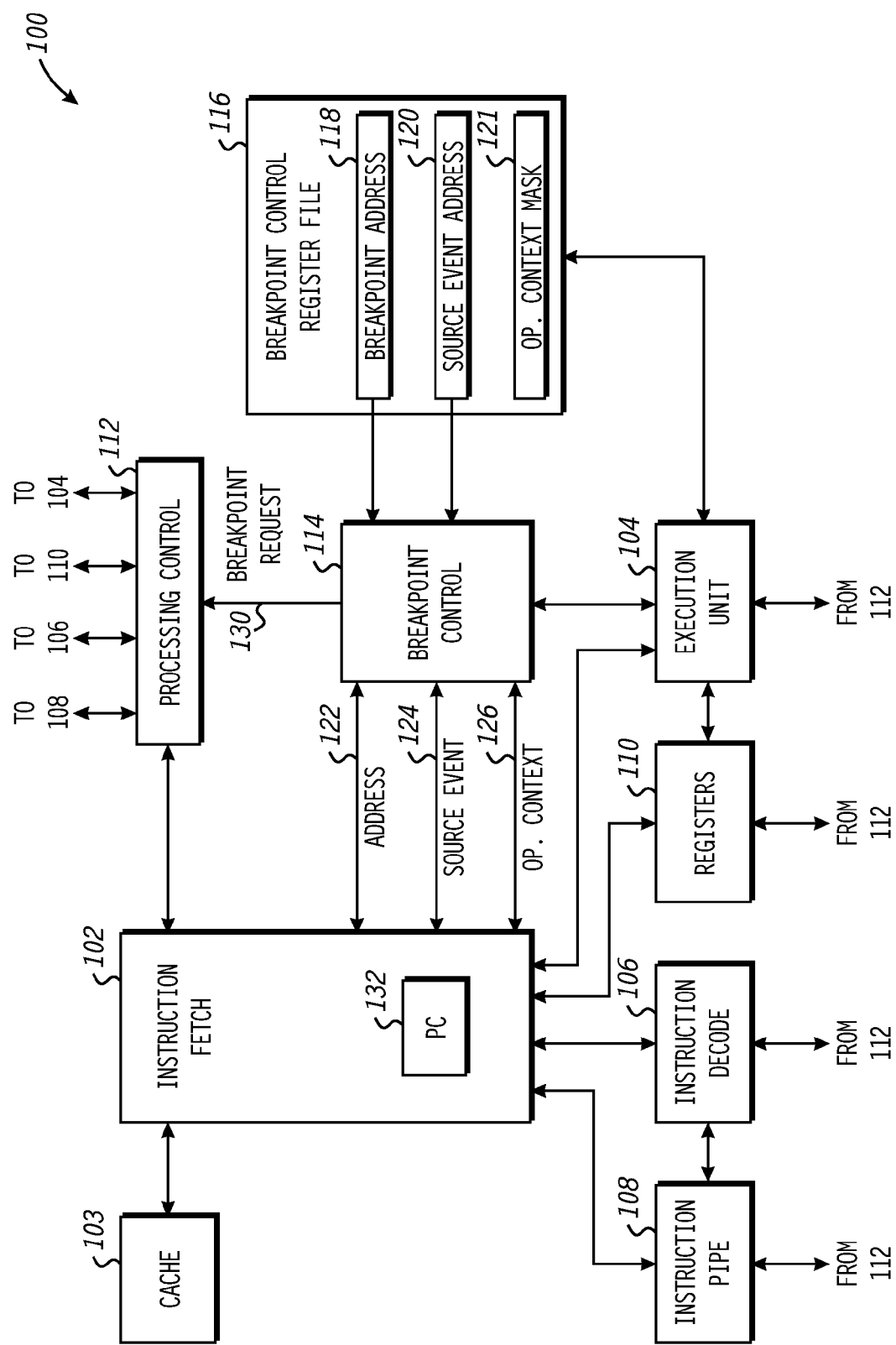
FIG. 1 is a block diagram illustrating an exemplary processing device utilizing a selective breakpoint generation scheme in accordance with at least one embodiment of the present disclosure.
Figure 2:
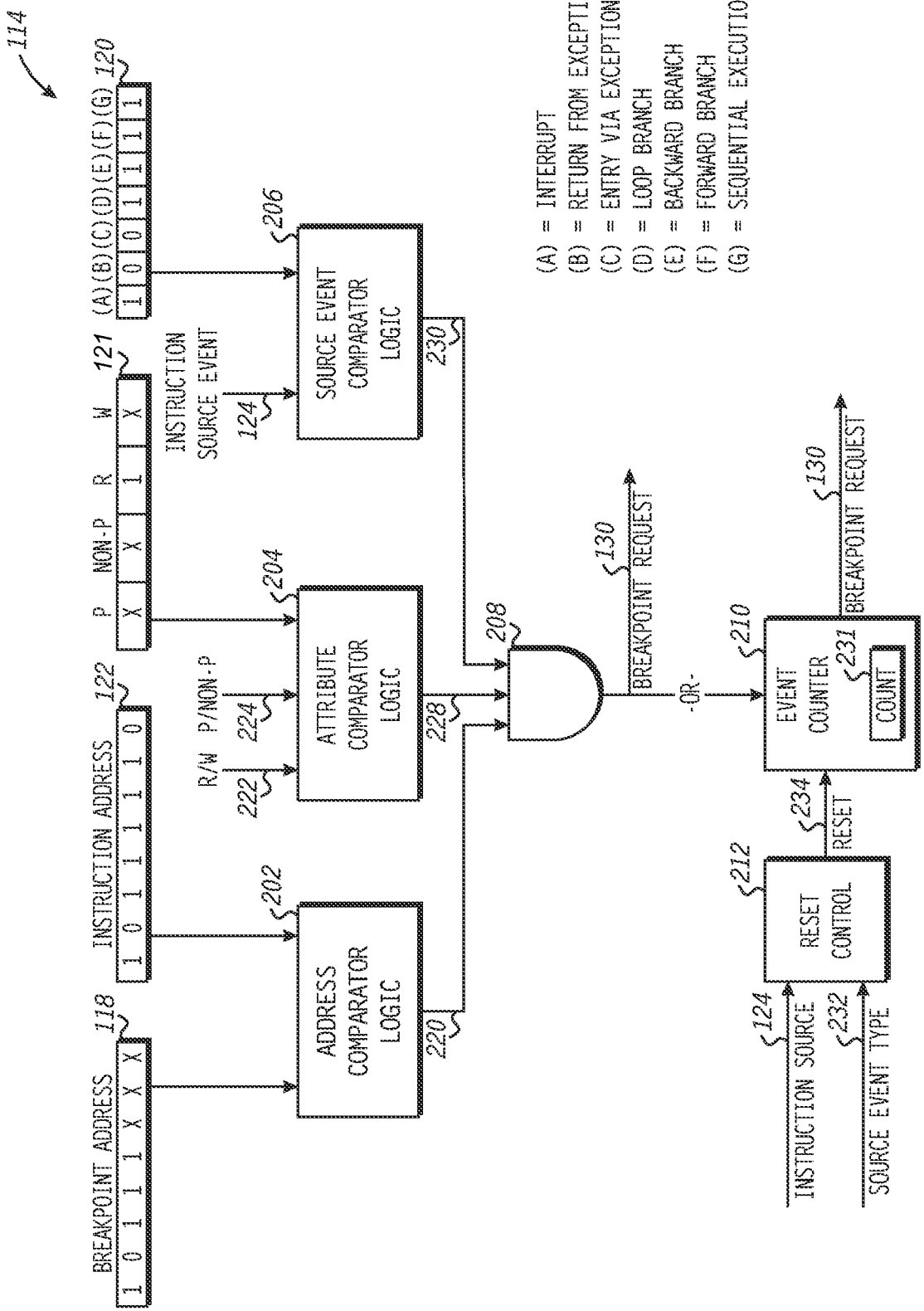
FIG. 2 is a block diagram illustrating an exemplary implementation of a breakpoint control module of the processing device of FIG. 1 in accordance with at least one embodiment of the present disclosure.
Figure 3:
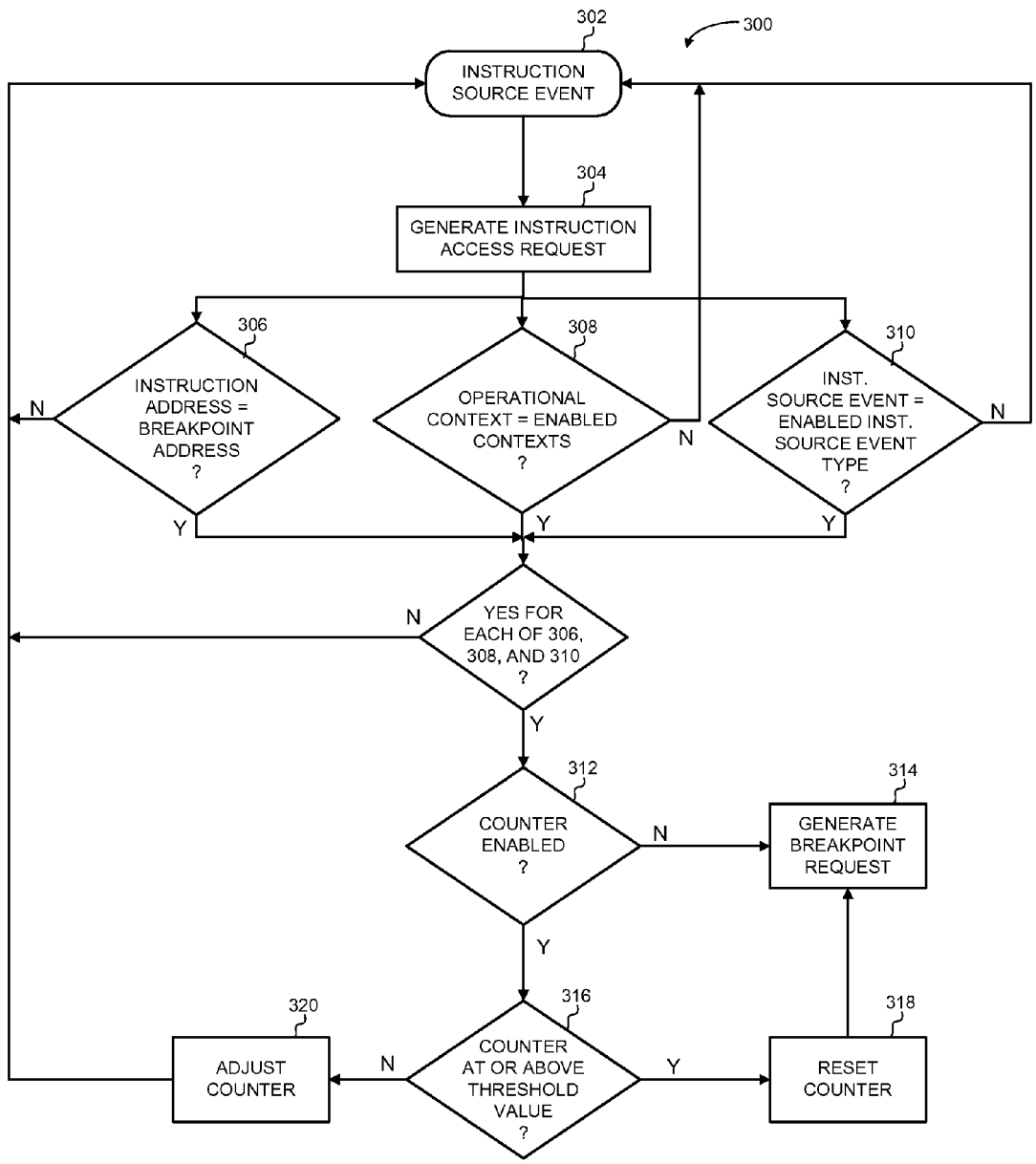
FIG. 3 is a flow diagram illustrating an exemplary method for selectively generating breakpoint requests in accordance with at least one embodiment of the present disclosure.

FIGS. 1-3 illustrate exemplary techniques for selectively generating breakpoint requests in a processing device for debugging purposes. In at least one embodiment, the instruction source event that triggered the generation or use of a particular instruction address in the processing device is compared with one or more predetermined instruction source event types. The particular instruction address also is compared with one or more predetermined breakpoint address values. In the event of a match between the instruction source event and a predetermined instruction source event type and a match between the instruction address and a predetermined breakpoint address value, a breakpoint request is generated. The breakpoint request then is processed by the processing device to generate a breakpoint interrupt that halts execution of a software routine being tested so as to facilitate debugging of the software routine.

The term "instruction source event," as used herein, is defined as the processing event that triggers or otherwise results in the generation or other use of an instruction address value. Types of instruction source events can include, but are not limited to, interrupts, a return from interrupt, a return from an exception, entry via an exception, forward branches in execution of an instruction sequence, backward branches in execution of an instruction sequence, loop branches, or a sequential execution of the next instruction in an instruction sequence. Certain of these instruction source events result directly from execution of specific instruction types, while other source events may occur independent of a specific instruction. For example, return from interrupt (with mnemonics rfi, rti, etc.), return from exception (with mnemonics rfe, rte, etc.), forward branch (conditional or unconditional branch with a positive displacement (with mnemonics b, br, bc, bcc, etc.)), backward branch (conditional or unconditional branch with a negative displacement (with mnemonics b, br, bc, bcc, etc.)), loop branch (decrement and branch, loop (with mnemonics dbcc, dbnz, bcnt, loop, etc.)) are examples of explicit instruction types. Execution of the next sequential instruction without a change of instruction flow is an example of instruction address generation that is not specifically related to execution of a specific instruction. An interrupt is an event that may be unrelated to execution of the program, but generates an instruction address for execution of the interrupt handler. Other exceptions may be related to processing of one or more instructions that results in an exceptional condition, and causes program flow to be re-directed to an exception event handler instruction address.

Referring to FIG. 1, an exemplary processing device 100 utilizing a selective breakpoint generation scheme is illustrated in accordance with at least one embodiment of the present disclosure. The processing device 100 can include, for example, a microprocessor, a microcontroller, a digital signal processor, a graphics processor, an application specific integrated circuit (ASIC), a system-on-a-chip (SOC), an embedded processor, and the like. In the illustrated example, the processing device 100 includes an instruction fetch module 102, a cache 103, an execution unit 104, an instruction decode module 106, an instruction pipe 108, registers 110, a processing control module 112, a breakpoint control module 114, and a breakpoint registers file 116. The breakpoint registers file 116 includes a plurality of registers, including breakpoint address registers 118 and corresponding source event mask registers 120. The components of the processing device 100 can be implemented as hardware, firmware, software, or combinations thereof. To illustrate, the modules 102, 104, 106, 108, 112 and 114 may be implemented as hardware logic components of a microprocessor, a microcontroller, a digital signal processor, a media processor, or a graphics processor.

In operation, the instruction fetch module 102 determines the instruction address associated with an instruction to be executed and fetches the instruction data representative of the instruction from the cache 103, if available, or from another memory component, such as external memory (not shown). The instruction data is provided to the instruction decode module 106, which decodes the instruction data to generate an executable instruction and provides the executable instruction for execution by the instruction pipe 108 and the execution unit 104.

The instruction address may be generated by the instruction fetch module 102 in response to any of a variety of instruction source events. To illustrate, the program flow may be sequential for two or more instructions and so the instruction fetch module 102 may identify the next instruction address to be fetched based on a program counter 132. Thus, the instruction source event that initiates the generation of the instruction address can include a sequential execution of instructions in which the program counter is incremented to point to a set of instructions sequentially. As another example, the processing device 100 may receive an interrupt from a peripheral component and, in response to the interrupt, may invoke an interrupt handling routine or otherwise initiate a change of program flow. Thus, the receipt of an interrupt can serve as an instruction source event due to the generation of the instruction address of the initial instruction of the interrupt handling routine resulting from receiving the interrupt. As another example, errors may occur during execution of instructions at the processing device 100, thereby causing the processing device 100 to generate an exception for processing. For example, an exception may be generated by a reset, a signal from a memory management unit (MMU), or by certain arithmetic processes, such as a divide-by-zero operation, overflow or underflow conditions, and the like. Thus, the entry into an exception or the return from an exception can be instruction source events that trigger the generation of an instruction address value at the processing device 100. As yet another example, the software program being debugged may implement changes of flow. To illustrate, the software may include instructions that result in a forward branch, a backward branch or a loop branch in the sequence of instructions. Thus, branches and other instruction-implemented changes of flow can be instruction source events that trigger the generation of an instruction address value at the processing device 100.

As part of the instruction fetch process, the instruction fetch module 102 provides certain information to the breakpoint control module 114 for use in determining whether to issue a breakpoint request. This information can include address information 122 representative of an instruction address value generated or otherwise used by the instruction fetch module 102 to fetch instruction data, source event information 124 representative of the instruction source event that triggered the generation of the instruction address value, and operational context information 126 representative of the operational context of the processing device 100 or the instruction being processed, such as whether the processing device is in supervisory mode (privileged) or user mode (non-privileged).

The breakpoint control module 114 further has access to the breakpoint control register file 116, which includes one or more breakpoint address registers 118 and corresponding source event mask registers 120 and operational context mask registers 121 for each configured breakpoint. Each breakpoint address register 118 stores a breakpoint address value indicating a particular instruction address value, a range of instruction address values, and optionally, an instruction address mask. Each source event mask register 120 stores one or more values indicating which instruction source event types are enabled in association with the breakpoint address value of the corresponding breakpoint address register 118. Each operational context mask register 121 stores one or more values indicating which operational context attributes are enabled in association with the corresponding breakpoint address value.

In response to receiving an instruction address value represented by address information 122 and the instruction source event that triggered the generation of the instruction address value as represented by source event information 124, the breakpoint control module 114 compares the received instruction address value to the breakpoint address values stored in the breakpoint address registers 118. Further, the breakpoint control module 114 compares the instruction source event associated with the received instruction address value with the enabled instruction source event types as indicated by the source event mask register 120. In the event that there is a match between the received instruction address value and a breakpoint address value (e.g., the instruction address value matches a specific breakpoint address value, the instruction address value falls within a specified permitted range or falls outside a specified excluded range, or matches an instruction address mask) and there is a match between the instruction source event and an enabled instruction source event type, the breakpoint control 114 initiates a breakpoint request by asserting a breakpoint request signal 130. Otherwise, if no match is found between the instruction address value and a breakpoint address value or between the instruction source event and an enabled instruction source event type, the breakpoint control module 114 refrains from initiating a breakpoint request.

In at least one embodiment, the breakpoint control module 114 also can compare the operational context of the processing device 100 as represented by the operational context information 126 with enabled operational context types as represented by the values in the operational context mask registers 121. In this instance, the initiation of the breakpoint request by the breakpoint control module 114 further may be contingent on a match between the operational context and one or more enabled operational context types. As an example, the operational context may include information such as the current privilege level of the processing device 100, the type of processing being performed, the type or nature of the instruction set being executed, or any other operational modes of the processing device 100. Operational context also is frequently referred to as a set of one or more "attributes" related to the instruction address value.

Further, a counter (not shown) may be used to count the number of occurrences of a particular instruction address value resulting from a particular instruction source event type. Thus, the breakpoint control module 114 may be configured to assert the breakpoint request signal 130 once the count has met or exceeded a certain threshold (a non-zero value in the case of an incrementing counter or zero in a decrementing counter).

In response to the asserted breakpoint request signal 130, the processing control module 112 generates a breakpoint interrupt and may initiate processing of the breakpoint interrupt by controlling instruction fetch module 102 to redirect processing operation to the address of the breakpoint exception handler, or may optionally place all or a portion of processing device 100 into a "debug" or "halted" state to allow for further examination of processing device 100 by a debugger. Thus, in response to the breakpoint interrupt, processing of the program instructions at the processing device 100 halts for debugging purposes. Alternately, the processing device 100 loads a debug handling routine in response to the breakpoint interrupt.

As discussed above, the breakpoint control module 114 can selectively generate a breakpoint request based on both a comparison of the instruction address value to a specified breakpoint address values and a comparison of the instruction source event that resulted in generation of the instruction address value to one or more selected instruction source event types. Thus, rather than simply triggering a breakpoint interrupt based only on matching instruction address values or on matching instruction address values and address attribute values, a user can configure the breakpoint address registers 118 and corresponding source event mask registers 120 via the execution unit 104 so that breakpoint interrupts are initiated for instruction address values generated in response to only certain types of instruction source events. As a result, the user can configure the debugging scheme implemented by the processing device 100 such that only certain instances of a particular instruction result in a breakpoint.

To illustrate, consider the following exemplary pseudo-code program:

```
outer_loop:      ....
                 .
                 inner_loop:
                 .
                 .
                 end inner_loop
                 .
end outer_loop
```

Assume for this example that a user desires to debug the outer_loop routine, when the third iteration of the outer_loop routine is reached, and the inner_loop routine is first entered. However, because the inner_loop routine has a data-dependent number of iterations, the number of times the inner loop's first instruction is fetched in the first two iterations of the outer loop is unknown, thus a conventional counting-based debugging scheme which attempted to cause a breakpoint to occur on the initial entry into the inner loop on the third iteration of the outer loop would not provide a user the desired breakpoint triggers. In contrast, the user could implement the selective breakpoint scheme described herein to implement the desired breakpoint trigger by configuring a counter and configuring the source event mask register 120 to indicate that the instruction source event type of sequential execution is enabled, thereby configuring the breakpoint control module 114 to initiate a breakpoint when the program flow enters the inner_loop routine for the third time.

Referring to FIG. 2, an exemplary implementation of the breakpoint control module 114 of the processing device 100 of FIG. 1 is illustrated. In the depicted example, the breakpoint control module 114 includes address comparator logic 202, attribute comparator logic 204, source event comparator logic 206, a signal generation module 208 (illustrated symbolically as an AND logic gate), an event counter 210 and a reset control module 212.

The address comparator logic 202 includes an input to receive a breakpoint address value from a breakpoint address register 118 (FIG. 1), an input to receive an instruction address value indicated by the address information 122, and an output to provide an address match signal 220 based on a comparison of the breakpoint address value to the instruction address value, where the address match signal 220 is asserted when there is a match.

The attribute comparator logic 204 includes inputs to receive operational context characteristic information, including a read/write (R/W) signal 222 indicating whether the processing device 100 is operating in a read mode or a write mode and a privileged/non-privileged (P/Non-P) signal 224 indicating whether the processing device 100 is operating in a privileged mode (e.g., a supervisor mode) or a non-privileged mode (e.g., a user mode). The attribute comparator logic 204 further includes an input to receive an operational context characteristic mask value stored in, for example, an operational context mask register 121 of the breakpoint control register file 116 (FIG. 1), where the operational context characteristic mask value indicates which operational characteristics are enabled or disabled. The attribute comparator logic 204 further includes an output to provide a context match signal 228 based on a comparison of the indicated operational context to the operational characteristic mask value, where the context match signal 228 is asserted when there is a match. In the illustrated example, the privileged and non-privileged operational contexts and the write context are indicated as "don't care" states while the read context is enabled. Thus, when the R/W signal 222 indicates that the processing device 100 is in a read mode, the attribute comparator logic 204 asserts the context match signal 228 regardless of the operational contexts indicated by the P/Non-P signal 224.

The source event comparator logic 206 includes an input to receive a source event mask value stored in a source event mask register 120 of the breakpoint control register file 116 (FIG. 1) and an input to receive an instruction source event indicated by the source event information 124 (FIG. 1). The source event comparator logic 206 further includes an output to provide a source event match signal 230 based on a comparison of the instruction source event to one or more enabled instruction source event types indicated by attributes values of the source event mask value, where the source event match signal 230 is asserted in response to a match between the instruction source event and an enabled instruction source event type. For example, the attribute values of the illustrated source event mask value indicate that interrupts, loop branches, backward branches, and forward branches are enabled instruction source event types, whereas returns from an exception and entries via an exception are disabled instruction source event types. Thus, in the illustrated example, the source event comparator logic 206 asserts the source event match signal 230 when the source event information 124 indicates that the instruction address value is generated resulting from an interrupt, a loop branch, a backward branch, or a forward branch. In contrast, the source event comparator logic 206 maintains the source event match signal 230 in an unasserted state when the source event information 124 indicates that the instruction address value is generated resulting from a return from an exception or an entry via an exception.

The breakpoint generation module 208 includes an input to receive the address match signal 220, an input to receive the context match signal 228, and an input to receive the source event match signal 230. The breakpoint generation module 208 also includes an output to provide the breakpoint request signal 130 (FIG. 1) in response to the address match signal 220, the context match signal 228, and the source event match signal 230, where the breakpoint request signal 130 is asserted when each of the signals 220, 228 and 230 are asserted and is unasserted when any of the signals 220, 228 or 230 is unasserted.

Alternately, the output of the breakpoint generation module 208 is provided to an input of the event counter 210, where a count 231 maintained by the event counter 210 is adjusted in response to an assertion of the output of the breakpoint generation module 208. The event counter 210 further includes an output to provide the breakpoint request signal 130 responsive to the count 231, where the breakpoint request signal 130 is asserted when the count 231 has reached a certain threshold. The threshold can include a value representative of a predetermined number of instances of the instruction represented by the instruction address value received at the address comparator logic 202 that has a specified instruction source event as indicated by the source event mask value received at the source comparator logic 206. Thus, the count 231 can be initialized to zero (in response to an asserted reset signal 234) and incremented until equal to the predetermined number of instances of the instruction. Alternately, the count 231 can be initialized to the predetermined number of instances of the instruction (in response to the reset signal 234) and decremented until equal to zero. In this manner, a breakpoint request may be generated based on the occurrence of a predetermined number of instances of a selected set of instruction source events corresponding to an instruction address.

The reset module 212 includes an output to provide the reset signal 234 for the purposes of initializing the event counter 210 to a predetermined starting value for the count 231. In one embodiment, the event counter 210 may be reset based on one or more selected instruction source events that resulted in the generation of an instruction address value. In this instance, the reset control module 212 includes an input to receive the instruction source event information 124 and an input to receive a value 232 representative of one or more predetermined source event types. The value 232 may be obtained from a source event mask register analogous to source event mask 120. The reset control module 212 asserts the reset signal 234 based on a comparison of the instruction source event indicated by the source event information 124 to the instruction source event type indicated by the value 232, where the reset signal 234 is asserted when there is a match. In response to receiving the reset signal 234, event counter 210 may be reset to a predetermined value. In one embodiment, the counter reset operation may be performed any time the reset signal 234 is asserted. In this embodiment, resetting of event counter 210 occurs regardless of the instruction address. In an alternate embodiment, event counter 210 may be reset to a predetermined value upon the assertion of reset signal 234 in conjunction with assertion of the output of breakpoint generation module 208. In this embodiment, only specific instruction addresses for which breakpoint generation logic 208 asserts a matching condition are considered for potential resetting of event counter, and a reset only occurs when one or more of the specific instruction source events indicated by source event type value 232 are also indicated by instruction source event information 124. Thus, a user can configure the breakpoint control module 114 to reset the event counter 210 via the reset control module 212 by configuring a particular instruction event type for input to the reset control module 212.

To illustrate, a user may desire a breakpoint at the third iteration of the outer loop of the exemplary pseudo-code program illustrated earlier, but only when no interrupt occurs during the preceding n−1 iterations. To accomplish this, the counter may be programmed to cause a breakpoint request to be generated upon reaching a count value of 3, the value of the breakpoint address register 118 may be programmed to the address of the first instruction of the outer_loop function, the value of the source event mask register 120 may be programmed to enable sequential execution and loop branch execution, and the reset control module 212 may be programmed to reset the event counter 210 when an interrupt occurs, corresponding to instruction source event of FIG. 2 in this manner. If no interrupt occurs before the execution of the third iteration of the outer loop, the event counter 210 will increment for the initial sequential entry into outer_loop function, and will increment for the succeeding two loop iterations caused by the loop branch at the end of outer_loop function, causing the breakpoint request signal 230 to be asserted by event counter 210 on the third iteration. If however, an interrupt occurs prior to reaching the third iteration of the loop, count 231 will be reset, and no breakpoint generation will occur. Following the successful uninterrupted execution of three iterations of the outer_loop function, a breakpoint may be generated as desired. While this example shows one use of reset control module 212 in conditioning breakpoint generation, many other useful examples will be apparent to those skilled in the art. In addition, although not illustrated, multiple reset control modules 212 may be implemented to obtain additional flexibility.

Referring to FIG. 3, an exemplary method 300 for selectively generating breakpoint requests is illustrated in accordance with at least one embodiment of the present disclosure. At block 302, an instruction source event occurs at a processing device. Examples of types of instruction source events can include, but are not limited to, an interrupt, an entry via an exception, a return from an exception, a branch (forward, backward, or loop), a sequential execution of instructions, and the like. At block 304, the method 300 includes generating an instruction access request in response to the instruction source event. The instruction access request is used by the processing device to fetch instruction data associated with an identified instruction from a cache or other memory. The instruction access request can include an instruction address value, a value or other indicator representative of the instruction source event, and the like.

At block 306, the method 300 includes comparing the instruction address value with one or more predetermined breakpoint address values to determine whether there is a match. The breakpoint address values can include a specific address value, a range of address values, an address value mask, and the like. At block 308, the method 300 includes comparing the operational context associated with the instruction access request with one or more enabled operational context types to determine whether there is a match. As described above, the operational context types can include, but are not limited to, a read mode context, a write mode context, a privileged mode context, a non-privileged mode context, and the like. At block 310, the method 300 includes comparing the instruction source event (from block 302) with one or more enabled instruction source event types to determine whether there is a match. Although FIG. 3 illustrates that the comparisons performed at blocks 306, 308 and 310 can be performed substantially in parallel at the processing device, it will be appreciated that the comparisons can be performed in sequence such that the performance of one comparison is contingent on a match resulting from another comparison. Further, it will be appreciated that in certain instances, operational context matching may not be implemented.

In the event that there is not a match at any of blocks 306, 308 or 310, the flow of method 300 returns to block 302 in preparation for the next instruction source event to occur. Otherwise, if there are matches for each of blocks 306, 308 and 310, the method 300 includes determining whether an event counter is enabled at the processing device for debugging purposes at block 312. If no counter is to be used, the method 300 flows to block 314, wherein a breakpoint request is generated at the processing device. As described above, the breakpoint request results in the generation of a breakpoint interrupt at the processing device, thereby allowing a user to debug the operation of the processing device and the program it is executing.

Otherwise, if a counter is in use, the method 300 includes determining whether the counter is at or above a predetermined threshold value at block 316. The predetermined threshold value typically represents a specified number of occurrences of the instruction address having a specified instruction source event type that are to occur before a breakpoint request is generated. Thus, if the counter is at or above the predetermined threshold value, the counter can be reset at block 318 and a breakpoint request can be generated at block 314. Otherwise, the counter is adjusted (e.g., by decrementing or incrementing) at block 320 and the flow of the method 300 returns to block 302 in preparation for the next instruction source event.

The above-disclosed subject matter is to be considered illustrative, and not restrictive, and the appended claims are intended to cover all such modifications, enhancements, and other embodiments that fall within the true scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
generating an instruction address value in response to an instruction source event;
adjusting a counter value responsive to a comparison of the instruction source event to a first instruction source event type resulting in a match and responsive to a comparison of the instruction address value to a breakpoint address value resulting in a match, the first instruction source event type enabled for breakpoint generation for the breakpoint address value;
resetting the counter value responsive to a comparison of the instruction source event to a second instruction source event type resulting in a match, wherein the second source event type is different than the first instruction source event type and not enabled for breakpoint generation for the breakpoint address value; and
selectively generating a breakpoint request based on the counter value.

2. The method of claim 1, further comprising:
determining an operational context associated with the instruction address value; and
wherein the breakpoint request further is selectively generated based on the operational context.

3. The method of claim 1, wherein selectively generating a breakpoint request based on the counter value comprises:
generating the breakpoint request responsive to the counter value equaling a predetermined value; and
omitting generation of the breakpoint request responsive to the counter value not equaling the predetermined value.

4. The method of claim 1, wherein the first instruction source event type is an interrupt.

5. The method of claim 1, wherein the first instruction source event type is an entry into an exception.

6. The method of claim 1, wherein the first instruction source event type is a return from an exception.

7. A hardware-implemented system comprising:
a breakpoint control register to store a breakpoint address value and a first stored value representative of a first instruction source event type enabled for breakpoint request generation for the breakpoint address value;
first comparator logic having a first input coupled to the breakpoint control register to receive the breakpoint address value, a second input to receive an instruction address value, and an output to provide an address match signal based on a comparison of the breakpoint address value to the instruction address value;
second comparator logic having a first input coupled to an breakpoint control register to receive the first stored value, a second input to receive an indication of an instruction source event that initiated the instruction access request, and an output to provide a source event match signal based on a comparison of the instruction source event to the first instruction source event type;
a breakpoint generation module having a first input coupled to the output of the first comparator logic to receive the address match signal, a second input coupled to the output of the second comparator logic to receive the source event match signal, and an output to provide a signal responsive to the address match signal and the source event match signal;
an event counter having an input coupled to the output of the breakpoint generation module, the event counter to:
adjust a count value responsive to the signal output by the breakpoint generation module; and
provide a breakpoint request signal responsive to the count value; and
a reset module to reset the count value of the event counter responsive to a comparison of the instruction source event to a second instruction source event type resulting in a match, wherein the second source event type is different than the first instruction source event type and not enabled for breakpoint request generation for the breakpoint address value.

8. The system of claim 7, wherein:
the breakpoint control register further comprises a second stored value representative of an operational context type; and
the system further comprises:
third comparator logic having a first input coupled to the breakpoint control register to receive the second stored value, a second input to receive an indication of an operational context associated with the instruction access request, and an output to provide a context match signal based on a comparison of the operational context type to the operational context; and
the breakpoint generation module includes a third input coupled to the output of the third comparator logic, wherein the breakpoint generation module further is to provide the signal responsive to the context match signal.

9. The system of claim 7, wherein:
the breakpoint control register further is configured to store a second stored value representative of a third instruction source event type; and
the second comparator logic includes a third input coupled to the breakpoint control register to receive the second stored value, and wherein the second comparator logic is configured to provide the context match signal based on the instruction source event and the third instruction source event type.

10. The system of claim 7, wherein the event counter is to provide the breakpoint request responsive to the count value matching a predetermined count value.

11. The system of claim 7, wherein the event counter is to:
provide the breakpoint request signal responsive to the count value equaling a predetermined value; and
omit provision of the breakpoint request signal responsive to the count value not equaling the predetermined value.

12. The system of claim 7, wherein the first instruction source event type is an interrupt.

13. The system of claim 7, wherein the first instruction source event type is an entry into an exception.

14. The system of claim 7, wherein the first instruction source event type is a return from an exception.

15. A hardware-implemented system comprising:
means for generating an instruction address value in response to an instruction source event;
an event counter to adjust a counter value responsive to a comparison of the instruction source event to a first instruction source event type resulting in a match and responsive to a comparison of the instruction address value to a breakpoint address value resulting in a match, the first instruction source event type enabled for breakpoint generation for the breakpoint address value;
a reset module to reset the counter value responsive to a comparison of the instruction source event to a second instruction source event type resulting in a match, wherein the second instruction source event type is different than the first instruction source event type and not enabled for breakpoint generation for the breakpoint address value; and
means for selectively generating a breakpoint request based on the counter value.

16. The system of claim 15, wherein the means for selectively generating a breakpoint request comprises:
means for comparing the instruction source event to the first instruction source event type;
means for comparing the instruction address value to the breakpoint address value; and
means for signaling the event counter to adjust the counter value responsive to a match between the first instruction source event type and the instruction source event and a match between the instruction address value and the breakpoint address value.

17. The system of claim 15, wherein the first instruction source event type is an interrupt.

18. The system of claim 15, wherein the first instruction source event type is an entry into an exception.

19. The system of claim 15, wherein the first instruction source event type is a return from an exception.

* * * * *